United States Patent [19]

Kanaya et al.

[11] Patent Number: 5,995,222
[45] Date of Patent: Nov. 30, 1999

[54] SUBJECT POSITIONING DEVICE FOR OPTICAL INTERFEROMETER

[75] Inventors: Motonori Kanaya; Kazuyoshi Yamasaki; Toshikazu Akaogi, all of Saitama-ken, Japan

[73] Assignee: Fuji Photo Optical Co., Ltd., Saitama-Ken, Japan

[21] Appl. No.: 08/775,193

[22] Filed: Dec. 30, 1996

[30] Foreign Application Priority Data

Dec. 28, 1995 [JP] Japan .................................. 7-353871
Mar. 29, 1996 [JP] Japan .................................. 8-103816
Apr. 15, 1996 [JP] Japan .................................. 8-116933
Apr. 16, 1996 [JP] Japan .................................. 8-119740

[51] Int. Cl.$^6$ ........................................ G01B 9/02
[52] U.S. Cl. .................................. 356/345; 356/359
[58] Field of Search ................... 356/345, 359, 356/360

[56] References Cited

U.S. PATENT DOCUMENTS 4,171,159 10/1979 White ..................................... 356/360
4,201,473 5/1980 Domenicali et al. .................. 356/360
5,666,198 9/1997 Stenton .................................. 356/360

*Primary Examiner*—Robert H. Kim
*Attorney, Agent, or Firm*—Young & Thompson

[57] ABSTRACT

A subject positioning device for an interferometer includes a positioning mechanism for positioning a test surface within an axial extent of interference positions in the object beam path, which is less than double of a thickness of the subject, and at least one positioning lens placed between a beam splitter and the axial extent of interference positions in the object beam path with a focal point located within the axial extent of interference positions.

30 Claims, 13 Drawing Sheets

FIG. 13A
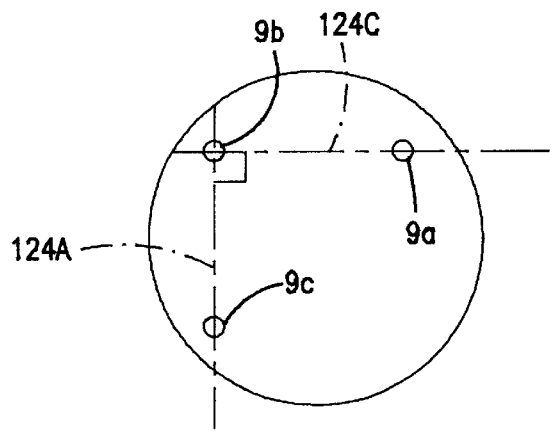
FIG. 13B
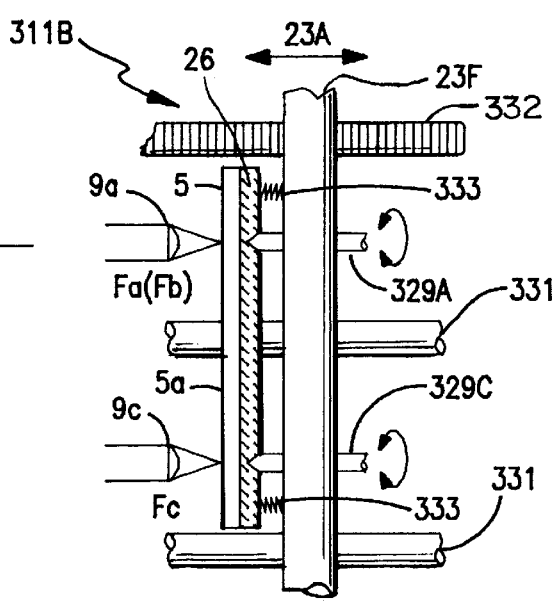
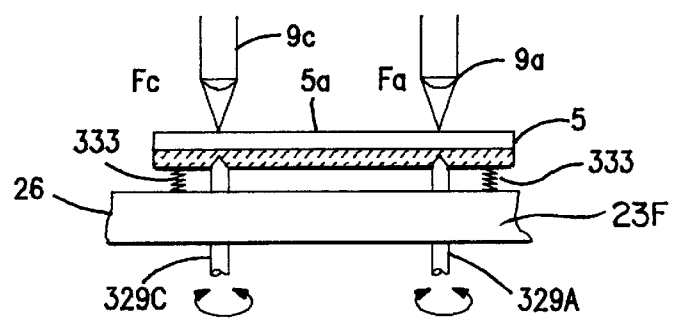
FIG. 13C

SUBJECT POSITIONING DEVICE FOR OPTICAL INTERFEROMETER

BACKGROUND OF THE INVENTION

1. Field of the Invention

This invention relates to a subject positioning device for an optical interferometer and, more particularly, to a subject positioning device for positioning a test surface of a thin plate subject within the axial extent of interference positions for interference in an object beam path of an optical interferometer whose object and reference beams have a short coherence length.

2. Description of Related Art

In interferometers such as Michelson interferometers, a reference beam and a subject beam into which a parallel beam of coherent light is divided by means of, for instance, a beam splitter, are directed to and reflected by a reference surface and a test surface of a thin plate subject, respectively. These reflected reference and subject beams are, thereafter, united by the beam splitter to interfere with each other, forming a pattern of interference fringes on an observation screen for examination of surface geometry or irregularity of the test surface of the subject.

In cases where using a laser beam to form interference fringes based on which surface geometry or irregularity examination of a test subject is made, because of a long coherence length of the laser light, it is unnecessary to position the test surface precisely with respect to the reference surface. There is a problem, if a thin transparent plate such as a glass plate, that the subject beam reflected by the surface opposite to the test surface of the subject interferes with both the reference beam and the subject beam reflected by the test surface of the subject to form interference fringes as noise in addition to essential interference fringes. In order for such a laser interferometer to avoid a ghost caused by the opposite surface of the subject which is superposed on the essential interference fringes necessary to a surface irregularity examination of, for example, a thin glass plate, the opposite surface of the thin glass plate is necessarily covered with a coat of, for instance, a refractive index matching oil, which is always undesirable from a viewpoint of handling a test subject and/or contamination of a test surface of the subject. Further, if a transparent test subject is considerably thin, a coat of a refractive index matching oil or the like exerts surface tension over the opposite surface of the test subject with an adverse effect of surface distortion, resulting in inaccurate surface examination.

It is desirable for surface irregularity examination of a subject, such as thin glass plates and the like, to use coherent light having a short coherence length shorter than double the thickness of the subject and to position the test surface of the subject within the axial extent of interference positions less than the coherent distance. For example, in cases where using a red light emitting diode (red LED), which has a coherence length of approximately 30 $\mu$m, as a light source, the axial extent of interference positions is less than only 15 $\mu$m. Unless the test surface is positioned within the small axial extent of interference positions, the pattern of interference fringes which demonstrates surface geometry or irregularities from the reference surface existing on the test surface cannot be formed.

SUMMARY OF THE INVENTION

It is, therefore, an object of this invention to provide a subject positioning device for an interferometer with a light beam having a short coherence length, which makes it easy to place a test surface of a thin plate subject within the axial extent of interference position in an object beam path.

The foregoing object of the present invention is accomplished by providing a subject positioning device for an interferometer which divides a light beam into an object beam and a reference beam by means of a beam splitter, directs these object and reference beams to a test surface of a subject and a reference surface, respectively, and causes interference between the object and reference beams after reflection by the test surface and the reference surface, respectively, to form a pattern of interference fringes which is examined to determine a solid geometric configuration of the test surface. The subject positioning device comprises positioning means for positioning the test surface within the predetermined axial extent of interference positions in the object beam path, and at least one positioning lens placed between the beam splitter and axial extent of interference positions in the object beam path with a focal point located within the axial extent of interference positions to form a spot of said object beam. It is noted that, in this specification, the term "axial extent of interference positions" shall mean limited axial positions in the object beam path which are predetermined to permit the object beam reflected by the test surface to interfere with the reference beam reflected by the reference surface as long as the test surface is within the axial extent of interference positions. The axial extent of interference positions is determined as being less than double a thickness of the subject plate.

The subject positioning device may further include display means including, for instance, a photoelectric device such as a charge coupled device (CCD) and a TV monitor which receives the beam spot and displays at least either one of a size and brightness of the spot on a screen which is examined to determine whether the test surface is in the axial extent of interference positions or not. The positioning lens is preferred to have a numerical aperture (NA) less than 0.6.

The subject positioning device may have more-than-one positioning lenses arranged on different straight lines. For example, three positioning lenses are used and located at apexes of a right-angled triangle.

BRIEF DESCRIPTION OF THE DRAWINGS

The above and other objects and features of the invention will be clearly understood from the following description with respect to a preferred embodiment thereof when considered in conjunction with the accompanying drawings, wherein the same reference numerals have been used to denote same or similar elements or parts throughout the drawings, and in which:

FIGS. 13A to 13C are schematic illustrations of a subject positioning device in accordance with still another embodiment of the present invention;

DETAILED DESCRIPTION OF THE SPECIFIC EMBODIMENTS

Figure 1:
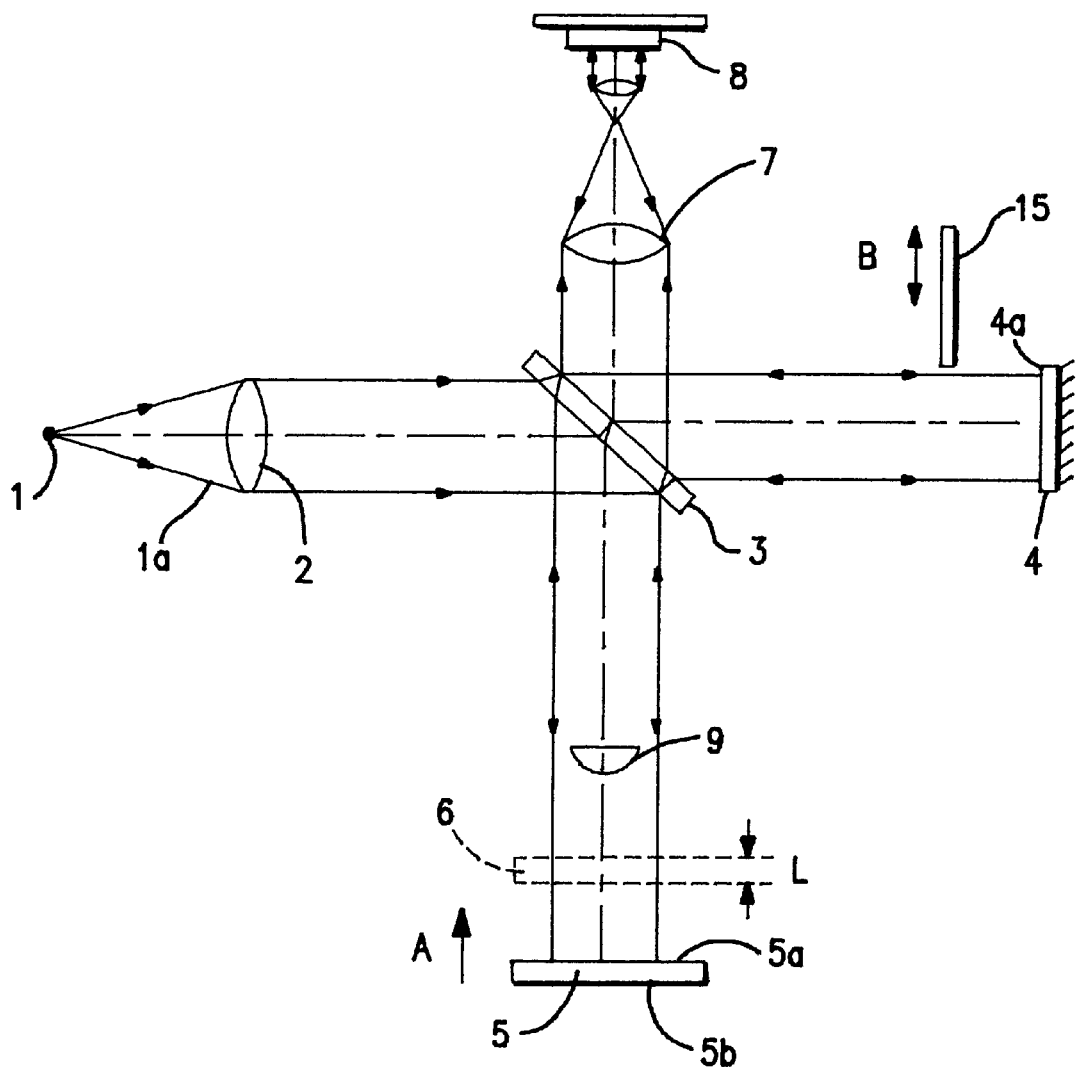
FIG. 1 is a diagrammatic side view of a Michelson-type interferometer in which a subject positioning device in accordance with an embodiment of the present invention is incorporated.

Referring to the drawings in detail, FIG. 1 schematically shows a subject positioning device according to an embodiment of the present invention which is suitably used with, for example, a Michelson-type interferometer. This interferometer comprises a light source 1 capable of emitting coherent light 1a having a short coherence length and various optical elements including a collimator lens 2, a beam splitter 3, a reference surface plate 4, an image forming lens system 7, and a charge coupled device (CCD) 8. A subject positioning device (which will be described in detail later) is installed in the interferometer to bring a subject into the path of a subject beam and place it in position. The coherent beam 1a emanating from the light source 1 is transformed into a parallel beam by means of the collimator lens 2 and thereafter divided by the beam splitter 3 into a reference beam and an object beam. The reference beam is reflected at a right angle and directed by the beam splitter 3 to a reference surface 4a of a reflective plate 4, and the object beam passes the beam splitter 3 and travels in a straight path to a test surface 5a of a subject plate 5 held in position by the subject positioning device. Both surfaces 4a and 5a reflect the reference and object beams, respectively, back to the beam splitter 3 to be compounded. The compounded reference and object beams interfere with each other and form a pattern of interference fringes on the CCD 8 through the imaging lens system 7. In order for the interferometer to avoid interference fringes generated by the object beam reflected by the back surface 5b of the subject plate 5 and the reference beam which are superposed as noise on essential interference fringes generated by the object beam reflected by the test surface 5a of the subject plate 5 and the reference beam, the light source 1 incorporated is capable of emitting a coherent beam 1a having a considerably short coherent length.

In cases where interferometers incorporate light sources capable of emitting a coherent beam having a considerably short coherent length, it is essential to adjust the test surface of a subject in vertical axial position so as to make both reference and object beams coincide in optical path length with each other. Specifically, as shown in FIG. 1, letting L and $S_{CL}$ be the axial extent of interference positions where the reference beam reflected by the test surface is enabled to interfere with the object beam as long as the test surface is placed within the axial extent of interference positions and the coherence length of the coherent beam 1a, respectively, the relationship of $L < S_{CL}/2$ is given between the axial extent of interference positions and the coherence length. In addition, the coherence length $S_{CL}$ must be considerably small with respect to the thickness t of the subject 5. For example, if a red LED capable of emitting light having a coherent length $S_{CL}$ of approximately 30 $\mu$m, the axial extent of interference positions L is less than 15 $\mu$m. Consequently, while a pattern of interference fringes is viewed in relation to the test surface 5a of the subject 5, no interference fringes are generated in relation to the back surface 5b.

Test subject 5 is moved in a direction indicated by an arrow A by the subject positioning device and positioned with the test surface 5a placed within the axial extent of interference position L. Because the axial extent of interference positions 6 is considerably small, positioning the test surface 5a within the axial extent of interference positions 6 requires proficiency and precise operation. In particular, when the subject 5 is positioned so as to place the test surface 5a within the axial extent of interference positions 6 monitoring a pattern of interference fringes on a monitor screen (not shown), it is quite hard to stop movement of the subject instantaneously when a pattern of interference fringes appears on the monitor screen. This is because the pattern of interference fringes changes on the monitor screen as quickly as the test subject 5 moves and because, while the test subject 5 is moving in the path of the object beam, a sharp pattern of interference fringes appears momentarily on the monitor screen.

In order to avoid these technical constraints and enable easy subject positioning operation, the interferometer is provided with a positioning lens 9, such as a condenser lens, positioned before the axial extent of interference positions 6 in the path of the object beam as shown in FIG. 1 to locate its focal point F within the axial extent of interference positions 6.

FIGS. 2A through 2C and 3A through 3C show subject positioning operation by use of the positioning lens 9.

Figure 2A:
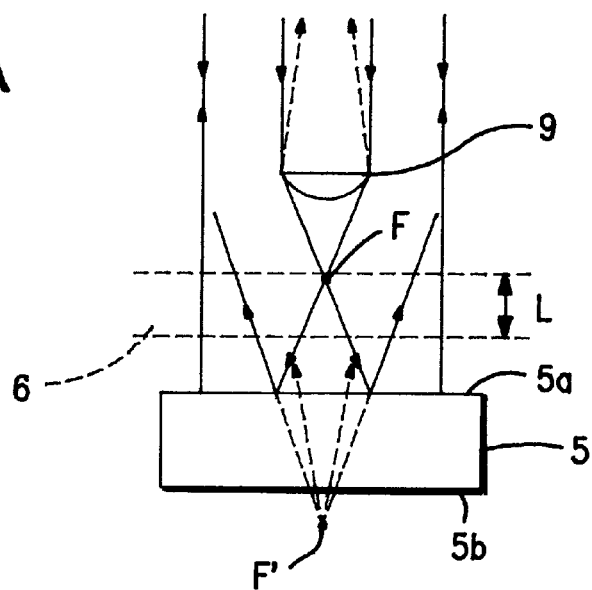
FIGS. 2A to 2C are illustrations showing a spot of an object beam in a view field of a monitor screen.

As shown in FIG. 2A, if the test surface 5a of the subject 5 is out of the axial extent of interference positions 6 and specifically on a side far below the focal point F of the positioning lens 9, the object beam focused by the positioning lens 9 on the focal point F of the positioning lens 9 diverges and reaches the test surface 5a. In this instance, the object beam reflected by the test surface 5a travels back as a divergent beam toward the positioning lens 9 as if it emanated from an imaginary point F' located symmetrically to the focal point F of the positioning lens 9 with respect to the test surface 5a. The divergent object beam from the test surface 5a of the subject 5 passes through the positioning lens 9 again and then travels back as a convergent beam to the beam splitter 3.

Figure 2B:
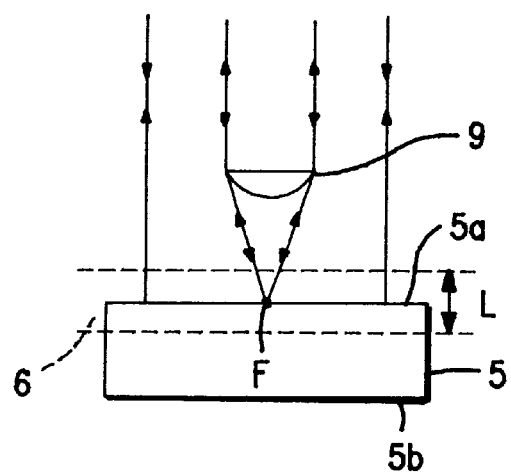

As shown in FIG. 2B, when the test surface 5a of the subject 5 coincides with a horizontal plane passing through the focal point F of the positioning lens 9 within the axial extent of interference positions 6, the object beam passing through the positioning lens 9 and reflected by the test surface 5a of the subject 5 travels back in the same path as it has traveled to the test surface 5a of the subject 5 and is then converted into parallel rays and travels back to the beam splitter 3 by the positioning lens 9.

Figure 2C:
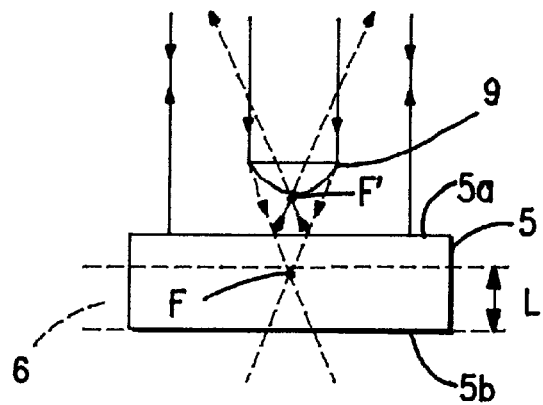

As shown in FIG. 2C, if the test surface 5a of the subject 5 is on a side far above the focal point F of the positioning lens 9, the object beam reflected back by the test surface 5a of the subject 5 is focused on a point F' located symmetrically to the focal point F of the positioning lens 9 with respect to the test surface 5a of the subject 5. In this instance, the object beam, after passing through the point F', travels back as a divergent beam and enters the positioning lens 9. Because the point F' is between the positioning lens 9 and the focal point F of the positioning lens 9, the object beam traveling back is diverged by the positioning lens 9 and then directed to the beam splitter 3.

Figure 3A:
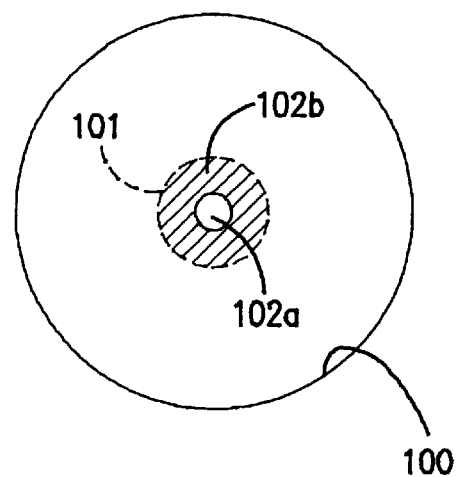
FIGS. 3A to 3C are detailed illustrations showing operation of a positioning lens of the subject positioning device shown in FIG. 1.
Figure 3B:
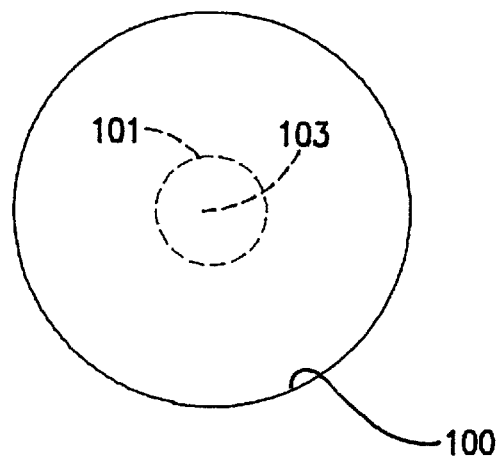
Figure 3C:
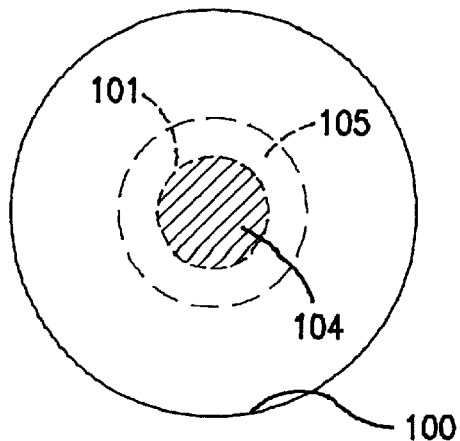

A spot of the object beam passing through the positioning lens 9 and projected on the CCD 8 by the imaging lens system 7 and viewed in a circular view field 100 on the monitor screen is shown in FIG. 3A, 3B or 3C. Specifically, the beam spot of the object beam reflected by the test surface 5a of the subject 5 positioned as shown in FIG. 2A and formed by the positioning lens 9 is shown in FIG. 3A. That is, a small and bright circular beam spot 102a is projected against a dark circular background 102b in an area 101 sized correspondingly to the positioning lens 9. FIG. 3B shows the spot of the object beam reflected by the test surface 5a of the subject 5 positioned as shown in FIG. 2B and formed by the positioning lens 9. In this instance, a bright beam spot 103 spreads in uniform brightness over the whole area 101 sized correspondingly to the positioning lens 9. The area 101 and its circumstance are substantially at the same level of brightness. FIG. 3C shows the spot of the object beam reflected by the test surface 5a of the subject 5 positioned as shown in FIG. 2C and formed by the positioning lens 9. In this instance, a relatively dark beam spot 104 spreading over the whole area 101 sized correspondingly to the positioning lens 9 is projected against a bright circular background 105.

As clearly understood from the above description, a projected spot of the object beam spreading in substantially uniform brightness at a specific level over almost the whole area 101 on the monitor screen and having no substantial difference from its circumstance in the circular view field 100 in brightness figures out that the test surface 5a of the subject 5 is properly placed within the axial extent of interference positions 6. For more precisely positioning the subject 5, it is desirable to make the positioning mechanism including the positioning lens 9 highly sensitive to a change in brightness and/or size of the spot of the object beam projected on the monitor screen by the positioning lens 9. One of solution for high sensitivity of the subject positioning device is to make use of positioning lenses 9 having F-numbers (which are defined as a ratio (f/D) of the focal length (f) relative to the aperture (D) of the positioning lens) as small as possible. Lenses having numerical apertures (NA) less than 0.6 are preferably used as the bright positioning lens.

Figure 4A:
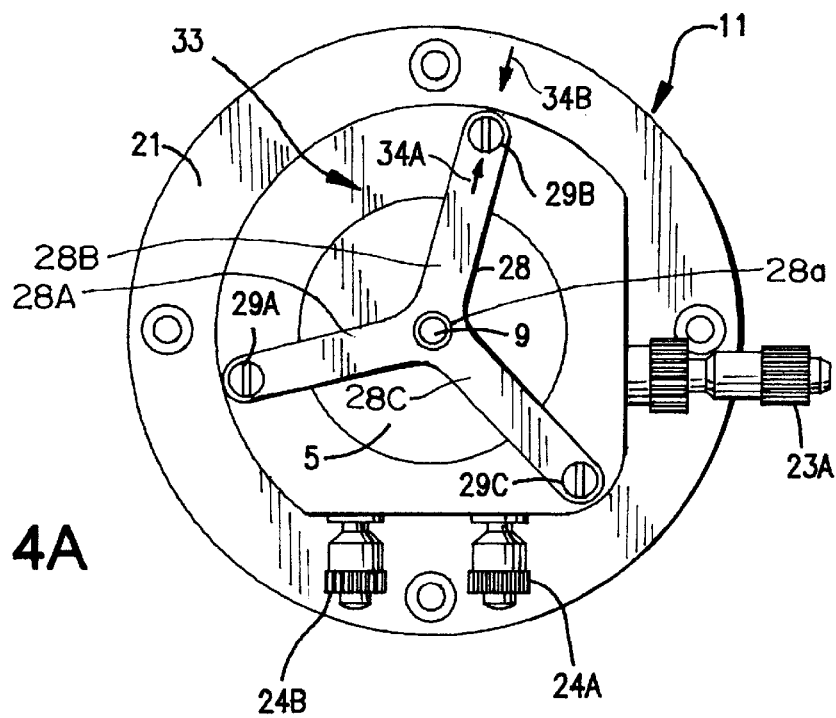
FIG. 4A is a plan view of the subject positioning device shown in FIG. 1.
Figure 4B:
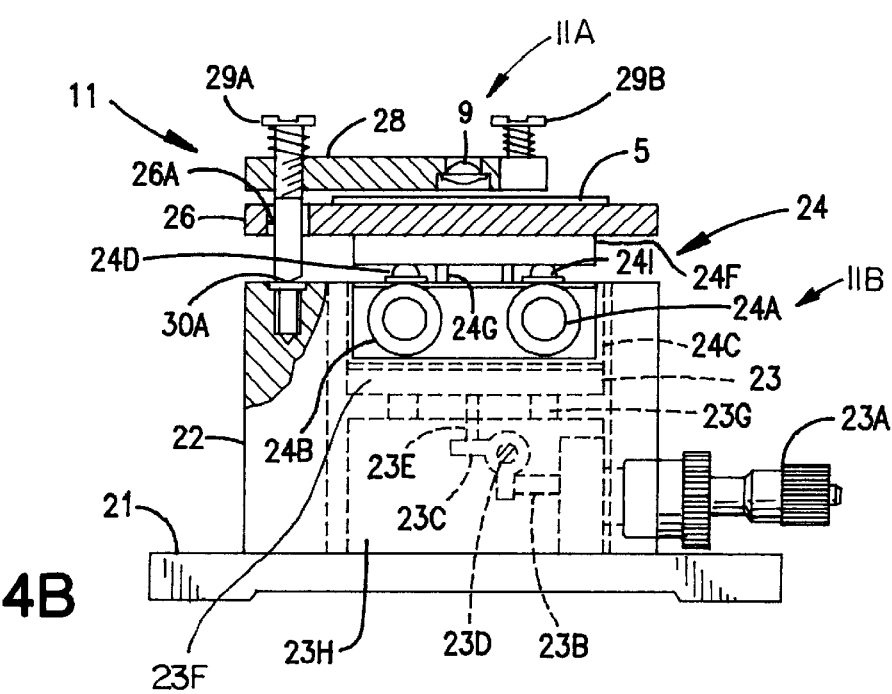
FIG. 4B is a front view, partly in cross section, of the subject positioning device shown in FIG. 1.
Figure 4C:
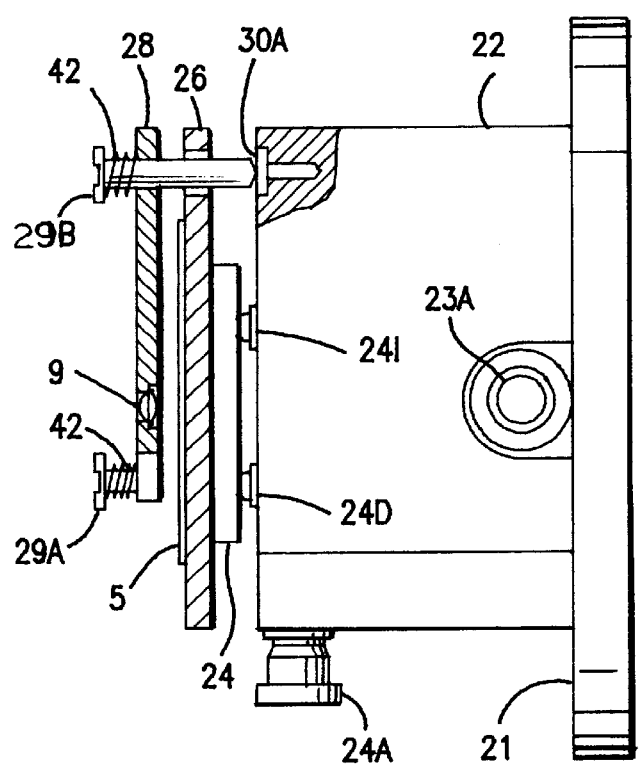
FIG. 4C is a side view, partly in cross-section, of the subject positioning device shown in FIG. 1.

FIGS. 4A through 4C show the subject positioning device 11 incorporated in the interferometer for bringing and placing a test surface of a subject in position within the axial extent of interference positions in the path of the subject beam. The subject positioning device 11 comprises two operationally independent mechanisms, namely a lens positioning mechanism 11A which holds the positioning lens 9 and adjusts it in position and a subject positioning mechanism 11B which adjusts a subject 5 placed thereon in position.

Figure 5:
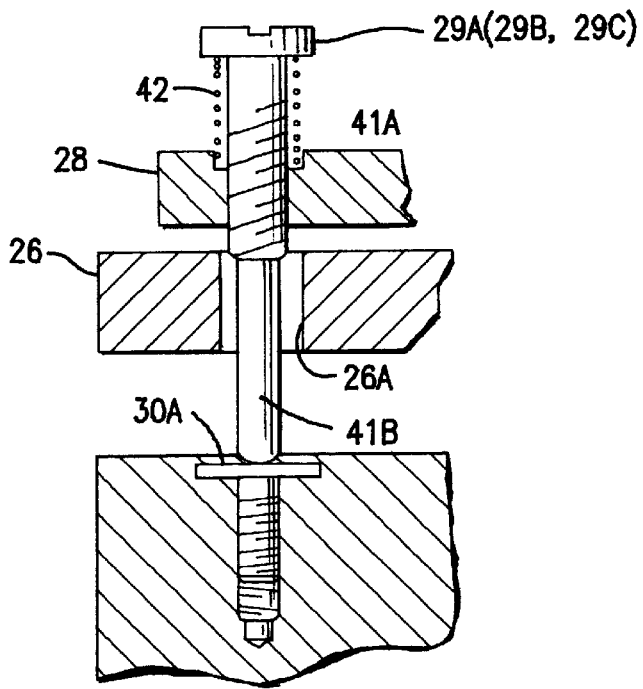
FIG. 5 is an enclosed cross-sectional view of a part of the subject positioning device shown in FIG. 1.

The subject positioning mechanism 11B includes a vertical position (Z-direction) adjustment stage 23, an inclination (in X- and Y-directions) adjustment stage 24 both of which are installed for slide movement in an open ended stationary housing 22 on a bed 21 of the interferometer, and a subject table 26 operationally coupled to these position and inclination adjustment stages 23 and 24 for placing a subject 5 thereon and formed with three through holes 26A separated at regular angular intervals. Specifically, the inclination adjustment stage 24 is placed on the vertical position adjustment stage 23, and the subject table 26 is placed on the inclination adjustment stage 24. The stationary housing 22 is provided at its cylindrical walls with a position adjustment micrometer 23A for vertical position adjustment of the vertical position adjustment stages 23 and two inclination adjustment micrometers 24A and 24B for inclination adjustment of the inclination adjustment stage 24. The vertical position adjustment micrometer 23A for the vertical position adjustment stages 23 has two adjustment knobs, namely a rough adjustment knob $23A_R$ and a fine adjustment knob $23A_F$ which are independently operative. Each adjustment knob $23A_R$ or $23A_F$ is turned in opposite directions, moving a push head 23B horizontally back and forth. Further, the stationary housing 22 is provided with three flat-head drive screws 30A–30C which are driven into the top of the cylindrical wall of the stationary housing 22 with their flat top surfaces sunk down from the top surface of the cylindrical wall of the stationary housing 22 as shown in FIG. 5. The flat top surfaces of the drive screws 30A–30C form a basic positioning surface for the lens positioning mechanism 11A. These flat-head drive screws 30A–30C are arranged at regular angular intervals correspondingly to the through holes 26A of the subject table 26.

Within the stationary housing 22 the vertical position adjustment stage 23 as a part of the subject positioning mechanism 11B has a vertical position adjustment table 23F, a base table 23H secured to the bed 21, and a swing cam 23C pivoted on a pivot shaft 23D secured to the base table 23H. The vertical position adjustment table 23F has a plurality of guide posts 23G extending vertically downward which are supported for slide movement by the base table 23H. The vertical position adjustment stage 23 is provided with an urging means (which is not shown and may take any form well known to those skilled in the art) between the base table 23H and the guide posts 23G within the base table 23H to urge the guide posts 23G downward. The swing cam 23C has two arms, separated at a right angle, which are respectively engaged by drive pin 23E secured to and extending vertically downward from the vertical position adjustment table 23F and the push head 23B of the vertical position adjustment micrometer 23A. The swing cam 23C is ordinarily urged in a counterclockwise direction as viewed in FIG. 4B by means of engagement with the drive pin 23E urged downward by the urging means.

The vertical position adjustment micrometer 23A of the vertical positioning stages 23 has two adjustment knobs, namely a rough adjustment knob $23A_R$ and a fine adjustment knob $23A_F$ which are independently operative. Each adjustment knob $23A_R$ or $23A_F$ is turned in opposite directions, moving the push head 23B back and forth to turn the swing cam 23C in opposite directions. Turning the rough adjustment knob $23A_R$ or the fine adjustment knob $23A_F$ for vertical position adjustment causes the push head 23B to horizontally move, turning the swing cam 23C to shift the vertical position adjustment table 23F vertically.

Figure 6A:
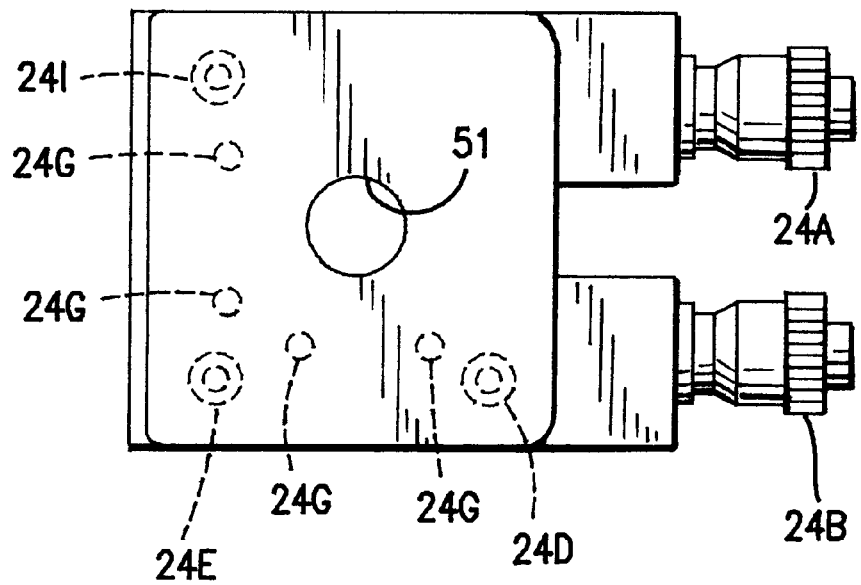
FIGS. 6A and 6B are plan views of an inclination adjustment mechanism of the subject positioning device shown in FIG. 1.
Figure 6B:
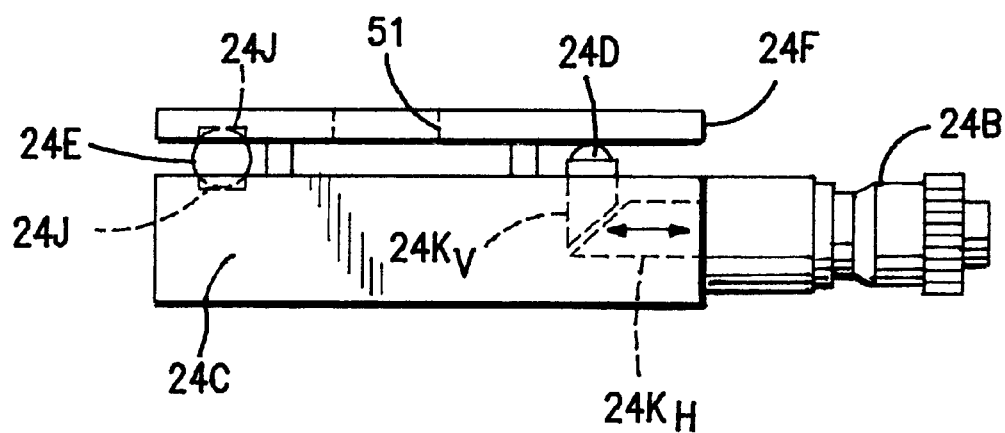

The inclination adjustment stage 24 as a part of the subject positioning mechanism 11B has a base table 24C placed on the vertical position adjustment table 23F for supporting an inclination adjustment table 24F. As shown in FIGS. 6A and 6B, the base table 24C is generally shaped square and is provided at one corner with a spherical support 24E placed thereon and a pair of drive pins 24D and 24I having a semi-spherical top ends at diagonally opposite corners. Each drive pin 24D, 24I is supported by a slide block $24K_V$ with a lower end cut at an angle of approximately 45°. This slide block $24K_V$ is received in the base table for vertical slide movement. The inclination adjustment micrometer 24B for the inclination adjustment stages 24 has a push head $24K_H$ whose foremost end is cut at an angle of approximately 45° to meet the lower end of the slide block $24K_V$ and move it up and down when the inclination adjustment micrometer 24A, 24B is turned in opposite directions. The inclination adjustment table 24F has a plurality of guide posts 24G extending vertically downward which are slidable supported by the base table 24C. Two of the guide posts 24G are disposed in close proximity to the sphere fulcrum 24E, and one of the guide posts 24G is disposed in close proximity to each drive pin 24D, 24I. An urging means (which is not shown and may take any form well known to those skilled in the art) is incorporated between the base table 24C and the guide posts 24G within the base table 24C to urge the guide posts 24G downward. As seen in FIG. 6B, the spherical support 24E is held between recesses 24J formed in the base table 24C and the inclination adjustment table 24F, respectively, to prevent sliding movement. Further, for making the subject positioning device 11 lightweight, the inclination adjustment table 24F may include center hole 51 and, if necessary, a plurality of holes.

Turning the inclination adjustment micrometer 24A in opposite directions causes horizontal movement of the push head $24K_H$ to force the slide block $24K_V$ upward and downward, inclining the inclination adjustment table 24F, and hence the subject table 26 placed on the inclination adjustment table 24F about the spherical support 24E as a fulcrum, in one direction, for example the X-direction defined by a straight line connecting the sphere fulcrum 24E and the drive pin 24D. Similarly, turning the inclination adjustment micrometer 24B in opposite directions causes horizontal movement of the push head $24K_H$ to force the slide block $24K_V$ upward and downward, inclining the inclination adjustment table 24F about the spherical support 24E as a fulcrum, and hence the subject table 26 placed on the inclination adjustment table 24F, in the Y-direction defined by a straight line connecting the sphere fulcrum 24E and the drive pin 24I, which intersects perpendicularly the X-direction.

As described above, since the subject table 26 is placed on the inclination adjustment table 24F placed on the vertical position adjustment table 23F, the subject table 26 can be adjusted in vertical position by means of the vertical position adjustment stage 23, and in horizontal inclination by means the inclination adjustment stage 24.

The lens positioning mechanism 11A includes a lens holder 28 having three radial arms 28A, 28B and 28C separated at regular angular intervals. This lens holder 28 is formed with a lens hole 28a at its center to hold the positioning lens 9 therein. As shown in detail in FIG. 5, the lens holder 28 has three position adjustment screw 29A, 29B and 29C threadingly engaged by the respective radial arms 28A, 28B and 28C. These vertical position adjustment screws 29A–29C, which are arranged at regular angular intervals to pierce the holes 26A of the subject table 26, are supported on the flat-head drive screws 30A–30C, respectively. Each of the position adjustment screws 29A–29C has an upper half 41A formed with threads and a lower half 42B having a rounded end and is screwed into the end of each arm 28A, 28B, 28C of the lens holder 28. Further, each position adjustment screw 29A, 29B, 29C is forced upward by a coil spring 42 disposed between the screw head and the lens holder 28 to remove or significantly reduce backlashes of the position adjustment screws 29A–29C. Turning any one of the position adjustment screws 29A–29C inclines the lens holder 28 centered with respect to the line connecting the remaining position adjustment screws. Consequently, inclination of the lens holder 28 with respect to a horizontal plane is unrestrictedly adjusted according to the amounts and directions of turns of these position adjustment screws 29A–29C. Practically, once the inclination adjustment of the lens holder 28 has been carried out, the position adjustment screws 29A–29C are fixed to the lens holder 28 with, for instance, an adhesive agent with an effect of eliminating a decrease in measuring accuracy due to dimensional errors of the position adjustment screws 29A–29C. The lens positioning mechanism 11A is placed over a subject supported on the subject table 26 before subject positioning.

Because the lens holder 28 is shaped to provide a space or opening 33 between each adjacent radial arms, a test subject 5 can be always viewed during subject positioning. When there is almost disappearing a difference in brightness between a spot 103 of the object beam and the view field 100 of the monitor screen as a result of positioning the test surface 5a of the subject 5 as shown in FIG. 3B, which indicates that the test surface 5a of the subject 5 is suitably positioned within the axial extent of interference positions, a pattern of interference fringes representing solid geometric configuration of the test surface 5a on the subject 5 can be viewed through the openings 33 between the radial arms of the lens holder 28. Consequently, the lens holder 28 enables the operator to realize it from the size and brightness of the beam spot, as well as from the pattern of interference fringes of the test surface 5a, that the test surface 5a is set within the axial extent of interference positions.

The same lens holder 28 may be available to various sizes of subjects whose diameters are not so different. While it is necessary to place the adjustment screws 29A–29C correspondingly on the flat top surfaces of the drive screws 30A–30C as basic positioning surfaces before examination of subjects different in size from those previously examined, pointer marks, such as arrows 34A and 34B, applied to one arm of the lens holder 28 and the top of the bed 21 to point the adjustment screw and the corresponding drive screw make it easy to place the adjustment screws 29A–29C on the flat top surfaces of the drive screws 30A–30C, correspondingly.

Figure 7:
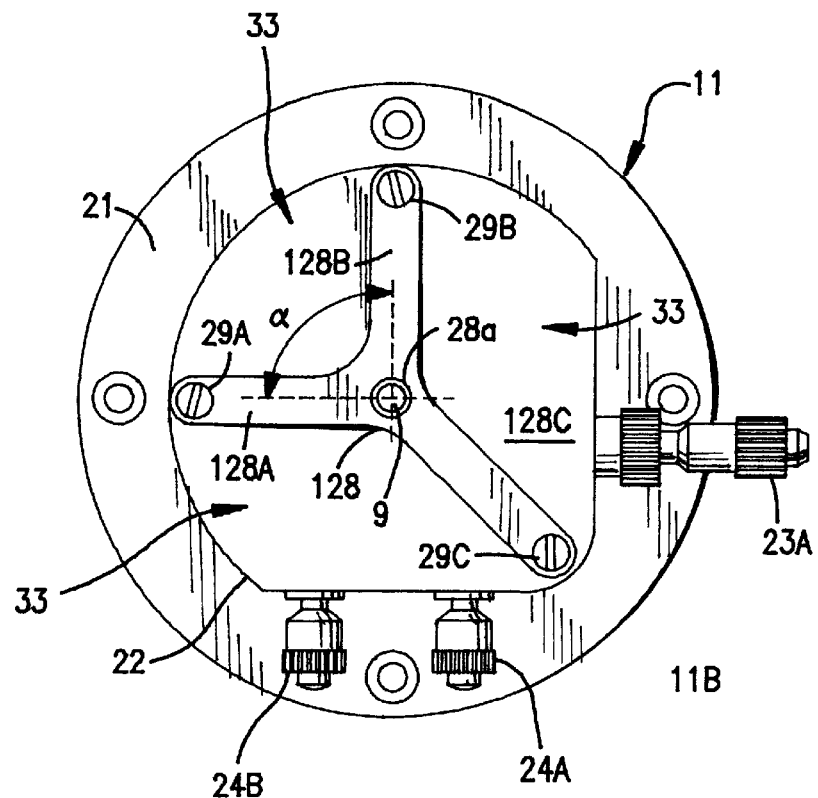
FIG. 7 is a plan view of a variation of the subject positioning device shown in FIG. 1.

The lens holder 28 may have three radial arms 128A, 128B and 128C arranged at different angular intervals. For example, only an included angle α between two adjacent radial arms 128A and 128B may be different from two other included angles between adjacent radial arms 128A and 128C, and 128A and 128C of a lens holder 128 as shown in FIG. 7. Otherwise included angles between the respective two adjacent radial arms 128A and 128B, and 128B and 128C, 128C and 128C may be different from one another. In this instance, it is of course to arrange the drive screws 30A–30C on the top of the stationary housing 22 at corresponding angles between the radial arms.

Alternatively, the lens holder 28 may be configured to have more-than-three radial arms, or otherwise in the form of a triangular frame or a circular frame, each having at least three adjustment screws which do not exist on a single straight line.

Figure 8:
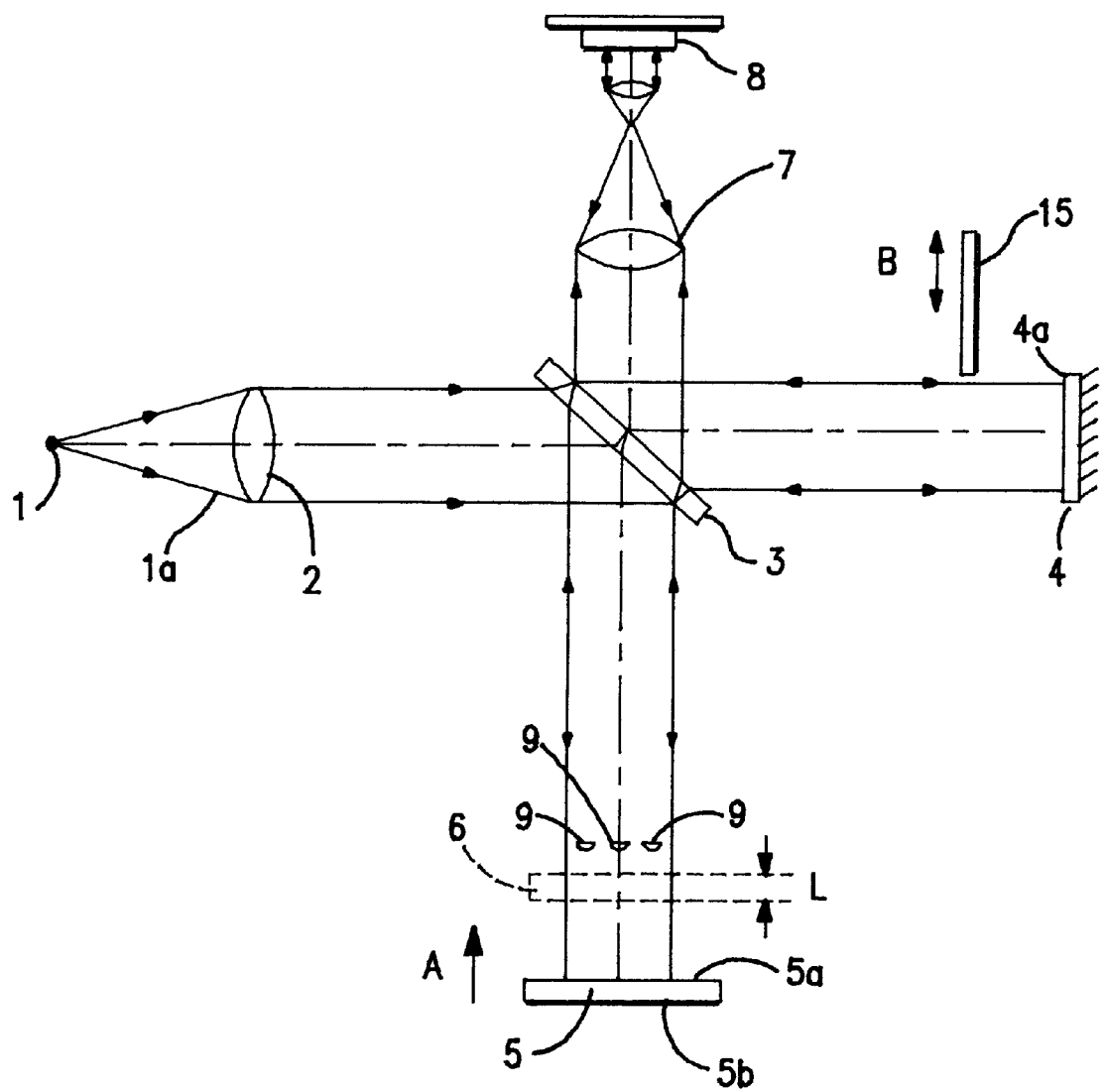
FIG. 8 is a diagrammatic side view of a Michelson-type interferometer in which a subject positioning device in accordance with another embodiment of the present invention is incorporated.

The subject positioning device 11 may have two or more-than-two positioning lenses 9 as shown in FIG. 8.

Figure 9:
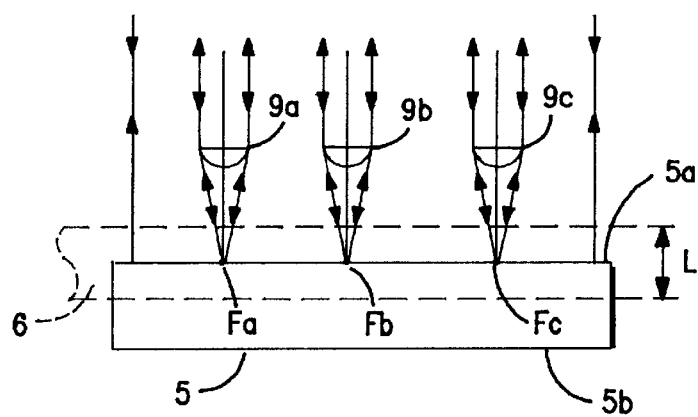
FIG. 9 is a detailed illustration showing operation of positioning lenses of the subject positioning device shown in FIG. 8.
Figure 10:
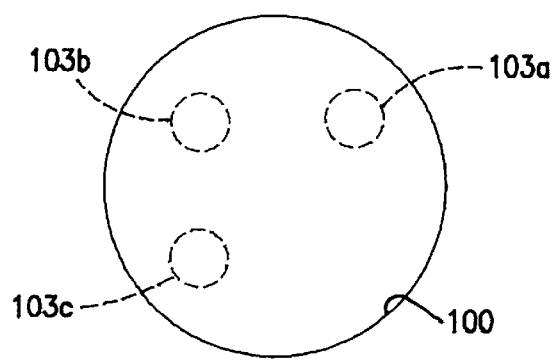
FIG. 10 is an illustration showing a spot of object beams in a view field of a monitor screen.

Referring to FIG. 8 showing a Michelson-type interferometer provided with a subject positioning device 211 (see FIG. 11) in accordance with another embodiment of the invention in which three positioning lenses 9a, 9b and 9c are installed for more easy and precise subject positioning, these positioning lenses 9a, 9b and 9c, such as condenser lenses, are disposed in a horizontal plane before the axial extent of interference positions 6 in paths of the object beams to locate their focal points F within the axial extent of interference positions 6. Each positioning lens 9a, 9b, 9c forms spots of the object beam as shown in FIGS. 3A, 3B and 3C according to vertical positions with respect to the axial extent of interference positions 6 of a test surface 5a of a subject 5 such as shown in FIGS. 2A, 2B and 2C, respectively. As was previously described in connection with the interferometer shown in FIG. 3B, the fact that a difference in brightness disappears between a spot 103a of the subject beam and the view field 100 of the monitor screen disappears demonstrates that an area 101a right below the positioning lens 9a of the test surface 5a of the subject 5 is suitably positioned within the axial extent of interference positions. Accordingly, when the subject 5 is positioned to place its test surface 5a in the same plane where all of the focal points Fa, Fb and Fc of the respective positioning lenses 9a, 9b and 9c exist as shown in FIG. 9, differences in brightness between spots 103a, 103b and 103c of the subject beams and the view field 100 of the monitor screen almost disappear as shown in FIG. 10, which demonstrates that the test surface 5a of the subject 5 is leveled and positioned within the axial extent of interference positions.

Figure 11:
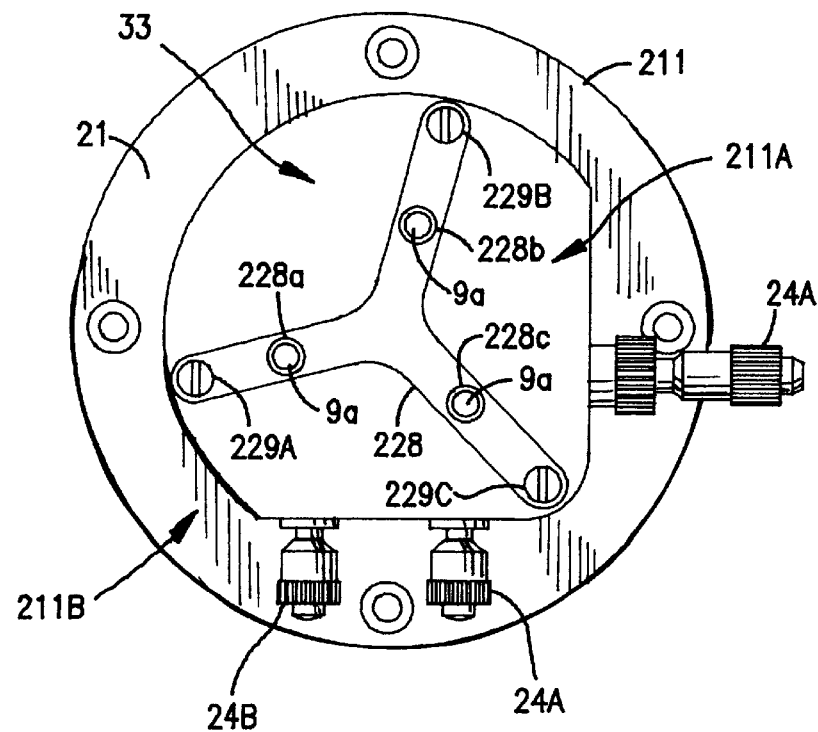
FIG. 11 is a plan view of the subject positioning device shown in FIG. 8.

The subject positioning device 211 incorporated in the interferometer of FIG. 8 includes a lens positioning device 211A shown in FIG. 11 in place of the lens positioning device 11A shown in FIGS. 4A and 4B.

Referring to FIG. 11, the lens positioning device 211A includes a three-armed lens holder 228 having radial arms arranged at regular angular intervals. The lens holder 228 is formed with lens holes 228a, 228b and 228c in the respective radial arms 228A, 228B and 228C to receive the positioning lenses 9a, 9b and 9c, respectively.

Figure 12:
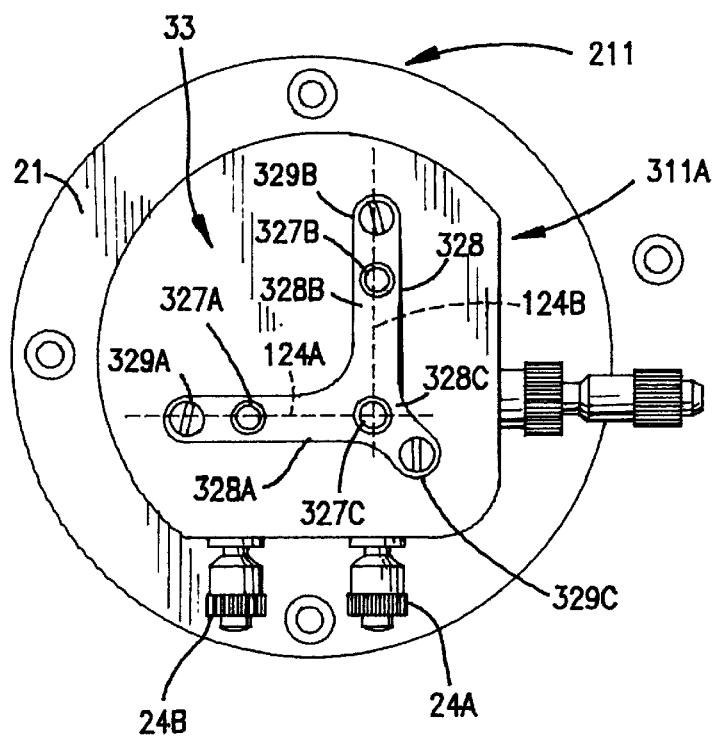
FIG. 12 is a plan view of a variation of the subject positioning device shown in FIG. 8.

As shown in FIG. 12, the subject positioning device 211 may otherwise have a lens positioning device 311A including a lens holder 328 to hold the positioning lenses 9a, 9b and 9c at three apexes of a right-angled triangle. The lens holder 328 has three arms, namely two intersecting arms 328A and 328B which form two sides intersecting at a right angle of the right-angled triangle and a short arm 328C extending from the right-angled corner. The arms 328A and 328B intersecting each other are directed in conformity with the directions (X and Y-directions) 124A and 124B in which the inclination adjustment table 24F is adjusted by the micrometers 24A and 24B, respectively. The third, short arm 328C is separated from both arms 328A and 328B at equal angles of 135°. The respective arms 328A, 328B and 328C at their ends are provided with adjustment screws 329A, 329B and 329C, respectively.

The subject positioning device 211 having the lens positioning device 211A enables vertical position (Z-direction) adjustment to be made by using the positioning lens 9c at the right-angled corner. Further, because the adjusting amount of inclination in either one of the X- and Y-directions can be adjusted to a change in spot size and brightness of the object beam projected by the positioning lens on one-to-one correspondence, it is made more easy to make adjustment of the vertical position and inclination of a test subject.

In cases where all of the positioning lenses 9a–9c are adjusted in vertical position relative (Z-direction) to one another, it is needed to adjust the positioning lens 9a first and then the positioning lenses 9a and 9b relative to the positioning lens 9c. To adjust the vertical position of each of the positioning lenses 9a and 9b, the utilization is made of a lens barrel for holding the positioning lens 9a, 9b which is threadingly engaged by the arm for vertical movement. By independently adjusting the positioning lenses 9a and 9b upward and downward, the relative vertical position is easily adjusted among the three positioning lenses 9a–9c.

FIGS. 13A through 13C show a lens positioning device 311B, similar to the lens positioning device 311A shown in FIG. 12, according to still another embodiment of the invention. As shown, three positioning lenses 9a, 9b and 9c are arranged at three apexes of a right-angled triangle. Specifically, the positioning lenses 9a and 9c are at ends of straight lines 124A and 124C forming two sides of the right-angled triangle which intersects at a right angle. The positioning lens 9b is at the right-angled corner of the right-angled triangle. The lens positioning device 311B includes adjustment screws 329A and 329C immediately below focal points Fa and Fc in the optical axes of the positioning lenses 9a and 9c, respectively, and a fixed support (not shown) for supporting a subject table 26 in a plane where the positioning lens 9b places its focal point Fb. The adjustment screws 329A and 329C are threadingly mounted in a vertical position adjustment table 23F for vertical movement with respect to the vertical position adjustment table 23F and are received in recesses of the subject table 26 to support it at their top ends. This vertical position adjustment table 23F is supported for up and down slide movement by a pair of guide posts 331, and driven up and down as shown by an arrow 23A by means of a motor-driven ball screw 332. Movement of the vertical position adjustment table 26 is stopped instantaneously when differences in brightness between spots 103a, 103b and 103c of the subject beams and the view field 100 of the monitor screen disappear as shown in FIG. 10, which demonstrates that the test surface 5a of the subject 5 is positioned within the axial extent of interference positions. Between the subject table 26 and vertical position adjustment table 23F there are disposed a plurality of drag springs 333 to urge the subject table 26 toward the vertical position adjustment table 23F.

One of the adjustment screws 329A and 329C, corresponding to one of the positioning lenses 9a and 9c which forms a beam spot with difference in brightness from the view field 100 of the monitor screen is turned independently from another until the difference in brightness disappears. Thereafter, the other of the adjustment screws 329A and 329C is turned until a beam spot formed through the other of the positioning lenses 9a and 9c gets rid of difference in brightness from the view field 100 of the monitor screen. In this manner, the subject table 26 is adjusted in position with a desired inclination.

Because the lens positioning device 311B shown in FIGS. 13A through 13C brings a test subject 5 into the path of the object beam and timely stops based on the brightness of a spot 103*b* of the object beam formed by the positioning lens 9*b* disposed at the right-angled corner, the only necessity for the lens positioning device 311B to incline the subject table 26 is to turn the adjustment screws 329A and 329C watching changes in brightness of the beam spots 103*a* and 103*c*.

As was previously described in connection with the interferometer shown in FIG. 3B, the fact that a difference in brightness disappears between a spot pattern 103*a* of the subject beam and the view field 100 of the monitor screen disappears demonstrates that an area 101*a* right below the positioning lens 9*a* of the test surface 5*a* of the subject 5 is suitably positioned within the axial extent of interference positions. Accordingly, when the subject 5 is positioned to place its test surface 5*a* in the same plane where all of the focal points Fa, Fb and Fc of the respective positioning lenses 9*a*, 9*b* and 9*c* exist as shown in FIG. 9, differences in brightness between spot patterns 103*a*, 103*b* and 103*c* of the subject beams and the view field 100 of the monitor screen almost disappear as shown in FIG. 10, which demonstrates that the test surface 5*a* of the subject 5 is leveled and positioned within the axial extent of interference positions.

Figure 14:
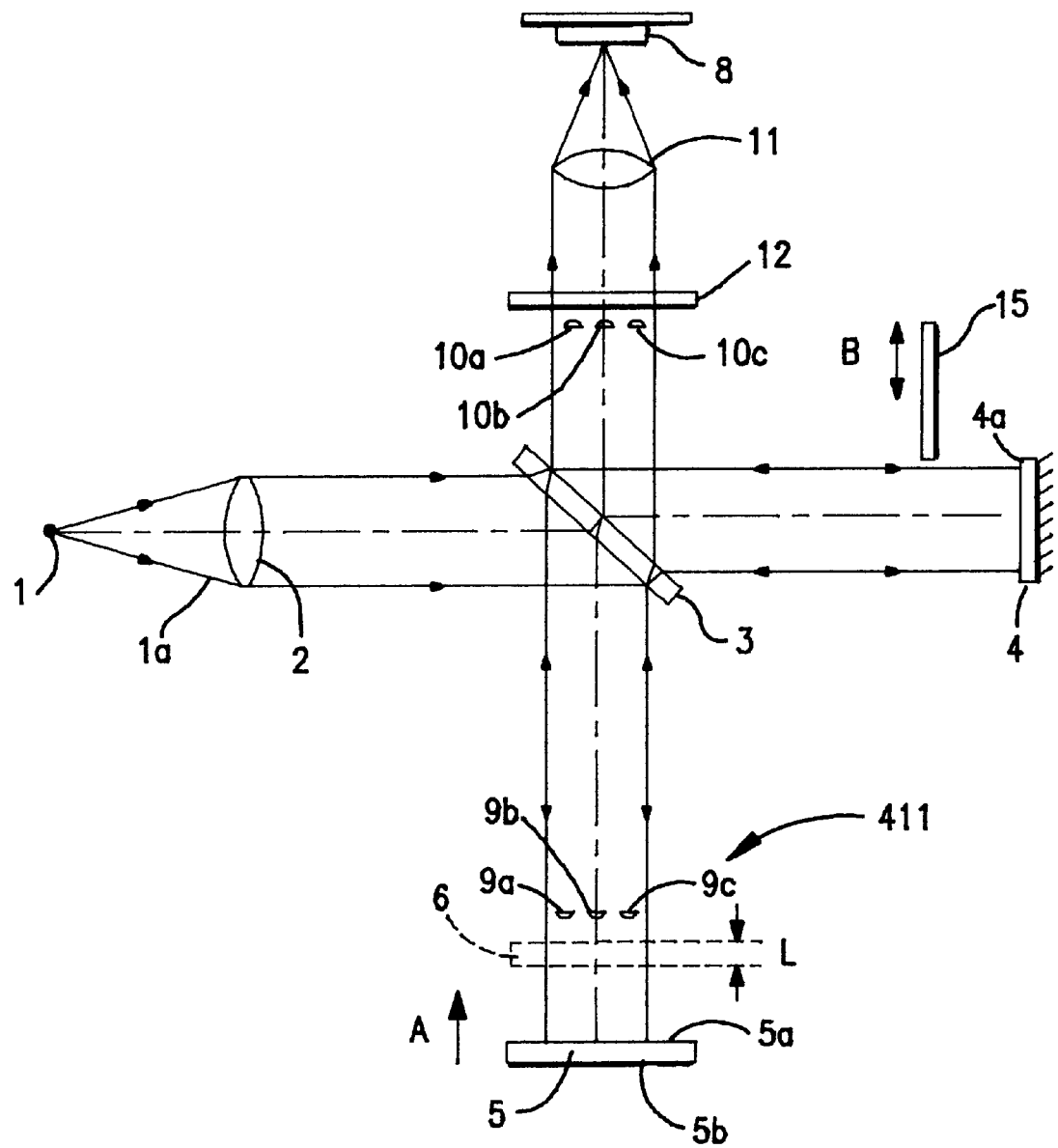
FIG. 14 is a diagrammatic side view of a Michelson-type interferometer in which a subject positioning device in accordance with a further embodiment of the present invention is incorporated.
Figure 15:
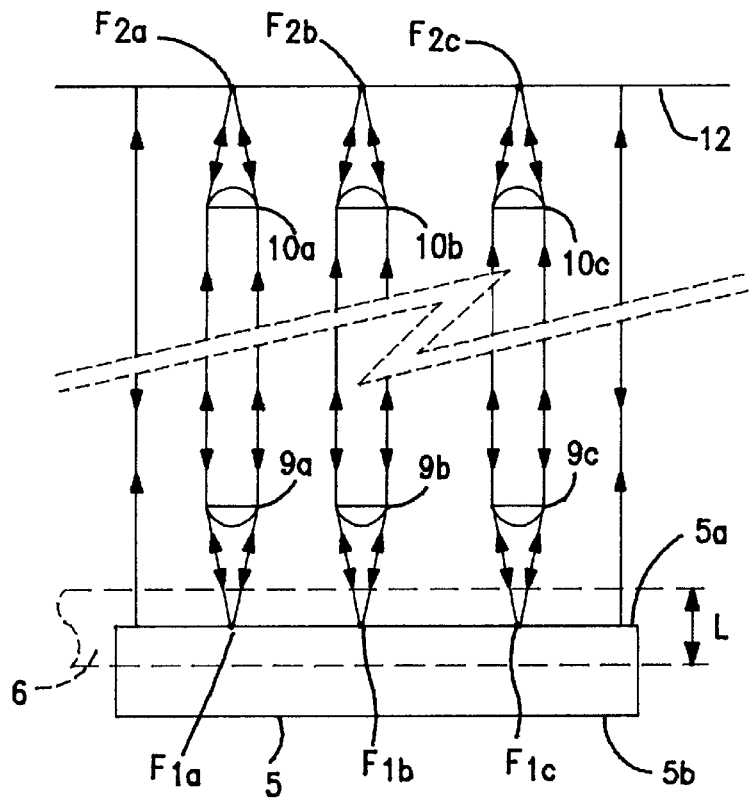
FIG. 15 is a detailed illustration showing operation of first and second groups of positioning lenses.

FIG. 14 shows a Michelson-type interferometer provided with a subject positioning device 411 in accordance with another embodiment of the invention in which a first group of three positioning lenses 9*a*, 9*b* and 9*c* and a second group of three positioning lenses 10*a*, 10*b* and 10*c* are installed for more easy and precise subject positioning. The first and second groups of positioning lenses 9*a*–9*c* and 10*a*–10*c*, such as condenser lenses, are disposed on opposite sides with respect to a beam splitter 3. Specifically, the positioning lenses 9*a*, 9*b* and 9*c* are arranged at regular angular intervals in a horizontal plane before the axial extent of interference positions 6 in paths of the object beams to locate their focal points F1a, F1b, F1c within the axial extent of interference positions 6 as shown in FIG. 15. The first group of positioning lenses 9*a*, 9*b* and 9*c* are incorporated in a subject positioning device similar to that shown in FIGS. 11, 12 or 13A to 13C. Similarly, the positioning lenses 10*a*, 10*b* and 10*c* are fixedly arranged at regular angular intervals in a horizontal plane and coaxially with the positioning lenses 9*a*, 9*b* and 9*c*, respectively, to form beam spots 103*a*, 103*b* and 103*c* on a transparent screen 12, respectively, on which the positioning lenses 10*a*, 10*b* and 10*c* locate their focal points F2a, F2b, F2c. An imaging lens 11 is disposed between the transparent screen 12 and a charge coupled device (CCD) 8 to form images of the beam spots 103*a*, 103*b* and 103*c*.

Figure 17:
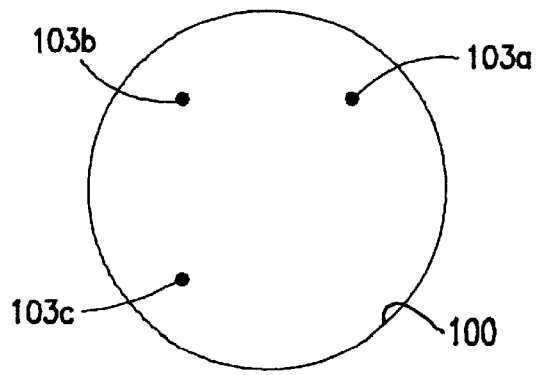
FIG. 17 is an illustration showing spots of object beams in a view field of a monitor screen.
Figure 16A:
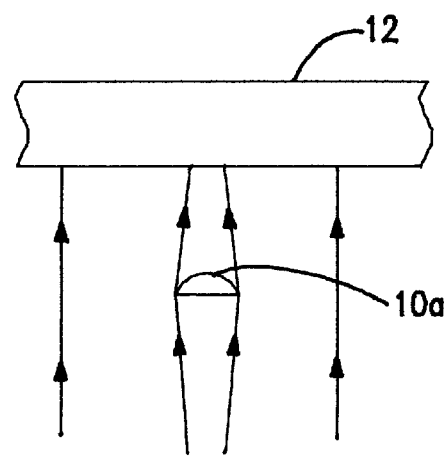
FIGS. 16A to 16C are detailed illustrations showing operation of second groups of positioning lenses of the subject positioning device shown in FIG. 14.
Figure 16B:
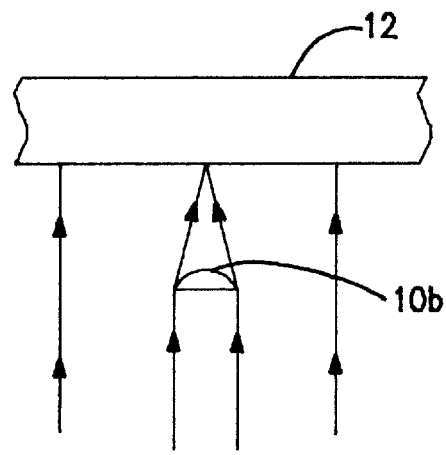
Figure 16C:
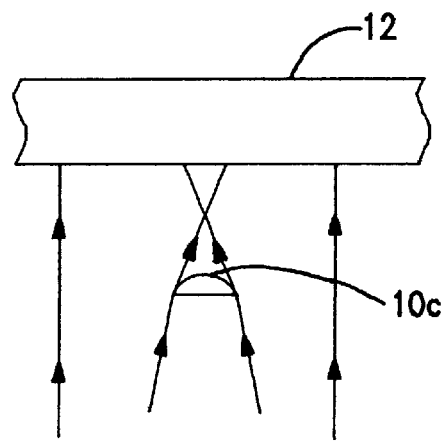

As shown in FIGS. 16A to 16C and 17, if the test surface 5*a* of the subject 5 coincides with the horizontal plane passing through the focal point F of the first positioning lens 9*a*, 9*b*, 9*c* within the axial extent of interference positions 6, each first positioning lens 9*a*, 9*b*, 9*c* converts the object beam reflected by the test surface 5*a* of the subject 5 into parallel rays and directs them toward the corresponding second positioning lens 10*a*, 10*b*, 10*c* as was previously described and shown in FIG. 2B. The second positioning lens 10*a*, 10*b*, 10*c* focuses the parallel rays and forms a point 103*a*, 103*b*, 103*c* on the transparent screen 12 which is projected on the CCD 8 by means of the and viewed in the view field 100 of a monitor screen as shown in FIG. 17. If the test surface 5*a* of the subject 5 is out of the axial extent of interference positions 6 and specifically on a side far below the focal point F of the first positioning lens 9*a*, 9*b*, 9*c*, each first positioning lens 9*a*, 9*b*, 9*c* diverges the object beam reflected by the test surface 5*a* of the subject 5 as was previously described and shown in FIG. 2A. The divergent object beam travels back toward the corresponding second positioning lens 10*a*, 10*b*, 10*c* after passing through the beam splitter 3. The second positioning lens 10*a*, 10*b*, 10*c* converges the object beam as shown in FIG. 16A and forms a beam spot having a somewhat large diameter on the transparent screen 12. On the other hand, if the test surface 5*a* of the subject 5 is on a side far above the focal point F of the positioning lens 9*a*, 9*b*, 9*c*, each first positioning lens 9*a*, 9*b*, 9*c* converges the object beam reflected by the test surface 5*a* of the subject 5 as was previously described and shown in FIG. 2C. The convergent object beam travels back toward the corresponding second positioning lens 10*a*, 10*b*, 10*c* after passing through the beam splitter 3. The second positioning lens 10*a*, 10*b*, 10*c* converges the object beam as shown in FIG. 16C and forms a beam spot having a somewhat large diameter on the transparent screen 12.

While, in the above embodiments, the lens holder 23, 228 or 328 are adapted to be manually moved into and removed out of the object beam for subject positioning, it may be operated automatically based on a signal distinguishable between subject positioning and surface examination of a subject.

Although the subject positioning device 411 includes three sets of first and second positioning lenses 9*a* and 10*a*, 9*b* and 10*b*, and 9*c* and 10*c*, if the inclination adjustment is carried out without using the positioning lenses, one or two sets of the first and second positioning lenses may be omitted. Further, it is possible to install more-than-three sets of the first and second positioning lenses in the subject positioning device 411. In cases where the beam spot has somewhat a small amount of light, the transparent screen 12 may be replaced by the CCD 8.

A light blocking plate 15 may be installed in the interferometer so as to move into the path of the reference beam between the beam splitter 3 and the reference surface plate 4 with the effect of blacking out the reference surface plate 4 during subject positioning and out of the path of the reference beam between the beam splitter 3 and the reference surface plate 4 before observation of the pattern of interference fringes as indicated by an arrow B in FIG. 1. Blacking out the reference surface plate 4 during the subject positioning yields an improved signal-to-noise ratio (S/N) of a spot pattern of the subject beam projected in the view field 100 of the monitor screen.

The positioning lens 9, (9*a*, 9*b* and 9*c*) may be placed in the path of marginal rays of the object beam to project a spot pattern of the object beam in close proximity to the margin of the circular view field 100 of the monitor screen so that the spot pattern is not an obstacle to observation of a pattern of interference fringes. Otherwise, if it is required to project the spot pattern of the object beam at the center of the view field 100 of the monitoring screen during subject positioning and/or to keep the spot pattern out of a pattern of interference fringes during observation of the pattern of interference fringes, the positioning lens 9 (9*a*, 9*b* and 9*c*) may be placed at the center of the path of the object beam during subject positioning and manually or automatically moved out of the path of the object beam after subject positioning. Further, in cases where a subject 5 is too small to leave light spots projected by the positioning lenses 9*a*, 9*b* and 9*c* on a test surface 5*a* of the subject 5 at the focal points Fa, Fb and Fc, respectively, during observation of a pattern of interference fringes, each positioning lens 9*a*, 9*b*, 9*c* may be removed out of the object beam, or otherwise both projection lenses 9*a* and 9*c* may be shifted along the straight lines 124A and 124C, respectively, or all of the projection lenses 9*a*, 9*b* and 9*c* may be shifted all at once.

The utilization may be made of a microcomputer as a central processing unit (CPU) to distinguish between the spot patterns of the object beam shown in FIGS. 3A, 3B and 3C and control the subject holding and driving mechanism to automatically position the test surface 5a of the subject 5 within the axial extent of interference positions.

The CCD 8 on which beam spots and interference fringes are projected may be replaced by a line sensor or a single element of sensor. In cases where a single element sensor is utilized, it must be disposed to detect a center portion of each beam spot.

The subject positioning device of the present invention may be installed in various types of interferometers in which object and reference beams have the same optical path length, such as the Mach-Zehnder type of interferometers.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A subject positioning device for an interferometer, which divides a light beam into an object beam and a reference beam by means of a beam splitter, directs said object beam and said reference beam to a test surface of a subject and a reference surface, respectively, and causes interference between said object beam and said reference beam after reflection by said test surface and said reference surface, respectively, to form a pattern of interference fringes for observation of a solid geometric configuration of said test surface, for positioning said test surface in a path of said object beam, said subject positioning device comprising:

positioning means for positioning said test surface within an axial extent of intereference positions in said path of said object beam predetermined to permit said object beam reflected by said test surface to interfere with said reference beam reflected by said reference surface; and at least one positioning lens placed between said beam splitter and said axial extent of interference positions in said path of said object beam with a focal point located within said axial extent of interference positions to form a spot in said object beam.

2. A subject positioning device as defined in claim 1, wherein said axial extent of interference positions is less in an axial direction than double of a thickness of said subject.

3. A subject positioning device as defined in claim 1, wherein said positioning lens is removably placed in said path of said object beam.

4. A subject positioning device as defined in claim 1, and further comprising display means for receiving said spot and displaying at least either one of a size and brightness of said spot.

5. A subject positioning device as defined in claim 1, and further comprising a light blocking shutter removably placed in front of said reference surface to black out said reference surface during subject positioning.

6. A subject positioning device as defined in claim 4, wherein said display means comprises a photoelectric device on which said positioning lens projects said spot and a TV monitor for display said spot projected on said photoelectric device.

7. A subject positioning device as defined in claim 6, wherein said photoelectric device comprises a charge coupled device.

8. A subject positioning device as defined in claim 1, and further comprising a photoelectric device on which said positioning lens projects said spot for providing an electric output according to brightness of said spot and control means for detecting difference of said electric output from a predetermined level and controlling said positioning means to move said subject in axial directions in said path of said object beam according to said difference.

9. A subject positioning device as defined in claim 1, wherein said positioning lens has a numerical aperture (NA) less than 0.6.

10. A subject positioning device as defined in claim 1, having three said positioning lenses arranged on different straight lines.

11. A subject positioning device as defined in claim 10, wherein said three positioning lenses are located at apexes of a right-angled triangle and said positioning means inclines said subject surface in perpendicular directions coincident with sides including a right angle of said right-angled triangle.

12. A subject positioning device as defined in claim 10, and further comprising display means for receiving said spot and displaying at least either one of a size and brightness of each said spot.

13. A subject positioning device as defined in claim 10, wherein said positioning lens has a numerical aperture (NA) less than 0.6.

14. A subject positioning device as defined in claim 11, and further comprising a photoelectric device on which each said positioning lens projects said spot for providing an electric output according to brightness of said spot and control means for detecting difference between said electric outputs in relation to said spots projected by said positioning lens on one of said sides of said right-angled triangle and controlling said positioning means to incline said test surface in a direction coincident with said one direction according to said difference.

15. A subject positioning device as defined in claim 12, wherein said display means comprises a photoelectric device on which said positioning lens projects said spot and a TV monitor for display said spot projected on said photoelectric device.

16. A subject positioning device as defined in claim 15, wherein said photoelectric device comprises a charge coupled device.

17. A subject positioning device as defined in claim 14, wherein said control means controls said positioning means to move said subject in axial direction in said path of said object beam according to said electric output provided by said photoelectric device in relation to said spot projected by said positioning lens located at a right-angled corner of said right-angled triangle.

18. A subject subject positioning device for an interferometer, which divides a light beam into an object beam and a reference beam by means of a beam splitter, directs said object beam and said reference beam to a test surface of a subject and a reference surface, respectively, and causes interference between said object beam and said reference beam after reflection by said test surface and said reference surface, respectively, to form a pattern of interference fringes for observation of a solid geometric configuration of said test surface, for positioning said test surface in a path of said object beam, said subject positioning device comprising:

positioning means for positioning said test surface within axial extent of interference positions in said path of said object beam predetermined to permit said object beam reflected by said test surface to interfere with said reference beam reflected by said reference surface;

at least one first positioning lens placed between said beam splitter and said axial extent of interference positions in said path of said object beam with a focal point located within said axial extent of interference positions to form a spot of said object beam; and at least one second positioning lens placed opposite to said first positioning lens with respect to said beam splitter and aligned coaxially with said first positioning lens to project said spot of said object beam on a plane at a focal point of said second positioning lens.

19. A subject positioning device as defined in claim 18, having three said first positioning lenses arranged on different straight lines, and three said second positioning lens arranged coaxially with said first positioning lenses, respectively.

20. A subject positioning device as defined in claim 18, wherein said first positioning lenses and said second positioning lenses are removably placed in said path of said object beam.

21. A subject positioning device as defined in claim 18, and further comprising a transparent screen on which said spot is projected, said transparent screen being removably placed in a plane, where said focal point of each said second positioning lens is located, in said path of said object beam.

22. A subject positioning device as defined in claim 18, and further comprising a light blocking shutter removably placed in front of said reference surface to black out said reference surface during subject positioning.

23. A subject positioning device as defined in claim 18, wherein each said first positioning lens and each said second positioning lens have an approximately same brightness and have numerical apertures (NA) less than 0.6, respectively.

24. A test subject positioning device for an interferometer which has a beam splitter which divides a light beam into an object beam and a reference beam and directs the object beam to a test surface of a test subject and directs the reference beam to a reference surface and which forms interference patterns from reflections from the test and reference surfaces for observing a configuration of the test surface, said test subject positioning device comprising:

a fixed frame;

a test subject positioning device carried by said frame for positioning the test subject in three dimensions, comprising an inclination positioning stage that is movable relative to said frame and a vertical position stage that is movable relative to said positioning stage and to said frame in a vertical direction coaxial with the object beam path, said inclination and vertical positioning stages being separately adjustable to position the test surface of the test object within a path of the object beam and within an axial extent of positions for creating the interference patterns;

at least one positioning lens in the path of the object beam for determining whether the test surface is within the axial extent of the positions for creating the interference patterns, said positioning lens having a focal point located within the axial extent of the positions for creating the interference patterns; and a mount carrying said positioning lens, said mount being removably carried by said frame and comprising position adjusters for changing a position of said mount relative to said frame.

25. The device of claim 24, comprising at least three of said positioning lenses that are spaced apart on said mount for observing different parts of the test surface.

26. The device of claim 24, wherein said position adjusters comprise adjustable length legs, and wherein said device further comprises supports in said frame on which said legs rest, said supports being separately adjustable in the vertical direction.

27. The device of claim 24, further comprising means for viewing the object beam, and wherein a shaded image of said lens is visible within the object beam when the test surface is not within the axial extent of the positions for creating the interference patterns and the shaded image of the portion of said lens is not visible within the object beam when the test surface is within the axial extent of the positions for creating the interference patterns.

28. The device of claim 24, further comprising means for viewing the object beam, and wherein one of the interference patterns and an image of said positioning lens are visible at the same time in said means for viewing.

29. The device of claim 1, wherein the spot in said object beam is an image of said positioning lens in the object beam, and wherein the focal point of said positioning lens is within said axial extent when the spot is indistinguishable from the object beam.

30. The device of claim 1, further comprising means for viewing the object beam, and wherein one of the patterns of interference fringes and an image of said positioning lens are visible at the same time in said means for viewing.

* * * * *